(12) United States Patent
Wan et al.

(10) Patent No.: US 10,226,906 B2
(45) Date of Patent: Mar. 12, 2019

(54) METHOD OF MANUFACTURING SOLE ASSEMBLY FORMED OF MULTIPLE PREFORMS

(71) Applicant: NIKE, Inc., Beaverton, OR (US)

(72) Inventors: Tee L. Wan, Portland, OR (US);
Thienchai Chaisumrej, Bangkok (TH);
Chia-Yi Wu, Long An Province (VN);
Yu-Chen Lin, Taipei (TW)

(73) Assignee: NIKE, Inc., Beaverton, OR (US)

( * ) Notice: Subject to any disclaimer, the term of this patent is extended or adjusted under 35 U.S.C. 154(b) by 764 days.

(21) Appl. No.: 14/252,045

(22) Filed: Apr. 14, 2014

(65) Prior Publication Data

US 2015/0290892 A1   Oct. 15, 2015

(51) Int. Cl.
*B29D 35/00* (2010.01)
*A43B 13/12* (2006.01)
*B29D 35/04* (2010.01)
*B29D 35/14* (2010.01)

(52) U.S. Cl.
CPC ........ *B29D 35/0054* (2013.01); *A43B 13/125* (2013.01); *B29D 35/04* (2013.01); *B29D 35/142* (2013.01)

(58) Field of Classification Search
CPC ... B29C 66/71; B29C 66/7212; B29C 66/004; B29C 66/1122; B29C 66/727; B29C 66/7392; B29C 66/8161; B29C 70/78; B29C 2035/0827; B29C 2793/009; B29C 33/58; B29C 33/64; B29C 33/76; B29C 35/02; B29C 37/0067; A43B 9/02; A43B 9/12; A43B 7/125; A43B 23/07; A43B 9/06; A43B 13/12; A43B 3/0078; A43B 7/144; A43B 13/04; A43B 13/16; A43B 7/12; A43B 9/00; A43B 23/0215; A43B 3/108; A43B 23/0295; A43B 23/24; A43B 13/125
USPC .................. 12/142 RS, 146 BR; 36/45, 30 R
See application file for complete search history.

(56) References Cited

U.S. PATENT DOCUMENTS

| 4,760,652 A | 8/1988 | Austin | |
| 5,586,354 A * | 12/1996 | Chi | ........................ A43B 13/00 12/142 RS |
| 5,725,823 A * | 3/1998 | Finn | ..................... A43B 13/223 264/244 |

(Continued)

FOREIGN PATENT DOCUMENTS

| DE | 19812694 A1 | 3/1999 |
| KR | 20130093982 A | 8/2013 |

(Continued)

OTHER PUBLICATIONS

Jul. 9, 2015—International Search Report and Written Opinion—PCT/US2015/023792.

*Primary Examiner* — Alissa L Hoey
*Assistant Examiner* — Catherine M Ferreira
(74) *Attorney, Agent, or Firm* — Banner & Witcoff, Ltd.

(57) ABSTRACT

A method of forming a sole assembly includes positioning a plurality of preforms having different colors together to form a sole assembly preform and placing the sole assembly preform in a recess in a first portion of a mold assembly. The sole assembly preform is subjected to heat for a predetermined amount of time such that the plurality of preforms bond to one another to form a sole assembly.

17 Claims, 7 Drawing Sheets

(56) References Cited

U.S. PATENT DOCUMENTS

| | | | | |
|---|---|---|---|---|
| 7,065,820 B2* | 6/2006 | Meschter | ............ | A43B 23/027 |
| | | | | 12/146 C |
| 8,246,881 B2* | 8/2012 | Maranan | ............... | A43B 13/125 |
| | | | | 264/238 |
| 2008/0073806 A1 | 3/2008 | Wang | | |
| 2010/0122476 A1* | 5/2010 | Le | ..................... | A43B 3/0078 |
| | | | | 36/30 R |
| 2011/0047720 A1* | 3/2011 | Maranan | ............ | A43B 13/125 |
| | | | | 12/146 B |
| 2014/0015169 A1 | 1/2014 | Wan et al. | | |

FOREIGN PATENT DOCUMENTS

| | | | | |
|---|---|---|---|---|
| WO | 2008019980 A2 | 2/2008 | | |
| WO | 2010045144 A2 | 4/2010 | | |
| WO | WO 2011082275 A1 * | 7/2011 | ............... | A43B 9/00 |
| WO | 2013023135 A1 | 2/2013 | | |

* cited by examiner

METHOD OF MANUFACTURING SOLE ASSEMBLY FORMED OF MULTIPLE PREFORMS

FIELD OF THE INVENTION

Aspects of this invention relate generally to a method of manufacturing a sole assembly, and, in particular, to a method of manufacturing a sole assembly formed of multiple preforms having different colors.

BACKGROUND OF THE INVENTION

Conventional articles of athletic footwear include two primary elements, an upper and a sole assembly. The upper provides a covering for the foot that comfortably receives and securely positions the foot with respect to the sole assembly. In addition, the upper may have a configuration that protects the foot and provides ventilation, thereby cooling the foot and removing perspiration. The sole assembly is secured to a lower portion of the upper and is generally positioned between the foot and the ground. In addition to attenuating ground reaction forces, the sole assembly may provide traction, control foot motions (e.g., by resisting over pronation), and impart stability, for example. Accordingly, the upper and the sole assembly operate cooperatively to provide a comfortable structure that is suited for a wide variety of activities, such as walking and running. An insole may be located within the upper and adjacent to a plantar (i.e., lower) surface of the foot to enhance footwear comfort, and is typically a thin, compressible member.

The sole assembly may incorporate multiple layers. Some footwear include only a midsole, while others may also include an outsole secured to a bottom surface of the midsole. The midsole, which is conventionally secured to the upper along the length of the upper, is primarily responsible for attenuating ground reaction forces. The midsole may also form the ground-contacting element of footwear. In such embodiments, the midsole may include texturing, such as projections and recesses or grooves, in order to improve traction. The outsole, when present, forms the ground-contacting element and may be fashioned from a durable, wear-resistant material.

The midsole may be primarily formed from a resilient, polymer foam material, such as ethylvinylacetate (EVA), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

The sole assembly may be formed of multiple portions, with some or all of the portions having different colors. When EVA is formed in a mold assembly the color lines between the different colored portions may bleed, decreasing the aesthetic appeal of the footwear.

It would be desirable to provide a method of manufacturing a sole assembly for an article of footwear that reduces or overcomes some or all of the difficulties inherent in prior known processes. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a method of manufacturing a sole assembly formed of multiple preforms. In accordance with certain embodiments, the preforms have different colors.

In accordance with a first aspect, a method of forming a sole assembly includes positioning a plurality of preforms having different colors together to form a sole assembly preform and placing the sole assembly preform in a recess in a first portion of a mold assembly. The sole assembly preform is subjected to heat for a predetermined amount of time such that the plurality of preforms bond to one another to form a sole assembly.

In accordance with another aspect, a method of forming a sole assembly includes positioning a first preform having a first color, a second preform having a second color, and a third preform having a third color together to form a sole assembly preform. The sole assembly preform is placed in a recess in a first portion of a heated mold assembly. The mold assembly is closed such that a second portion of the mold assembly is above and in contact with the first portion. The sole assembly preform is subjected to heat for a predetermined amount of time such that the first, second, and third preforms bond to one another to form a sole assembly. The mold assembly is opened the sole assembly is removed from the mold assembly In accordance with a further aspect, a method of forming a sole assembly includes forming a first preform having a first color in a recess of a first mold assembly, with a bottom surface of the recess including surface irregularities. A plurality of second preforms having a second color are formed in first recesses of a second mold assembly. A third preform having a third color is formed in a second recess of the second mold assembly. The first preform, the second preforms, and the third preform are positioned together to form a sole assembly preform. The sole assembly preform is placed in a recess in a first portion of a heated third mold assembly. The third mold assembly is closed such that a second portion of the third mold assembly is above and in contact with the first portion. The sole assembly preform in the third mold assembly is subjected to heat for a predetermined amount of time such that the first, second, and third preforms bond to one another to form a sole assembly. The third mold assembly is opened and the sole assembly is removed from the third mold assembly. The sole assembly is allowed to cool, and is then trimmed.

Features and advantages of manufacturing sole assemblies for footwear as disclosed here will be further understood from the following detailed disclosure of certain embodiments.

Figure 1:
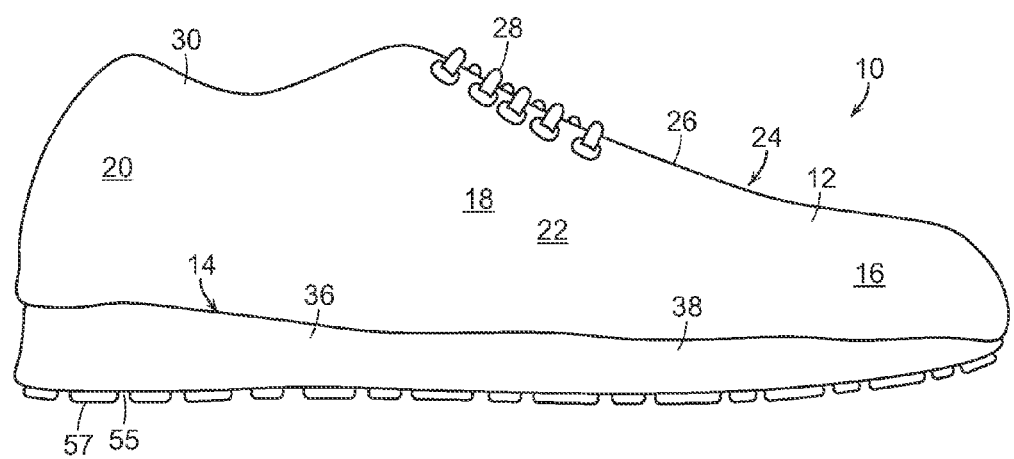
FIG. 1 is an elevation view of an article of footwear including an upper and a sole assembly.

The figures referred to above are not drawn necessarily to scale, should be understood to provide a representation of particular embodiments of the invention, and are merely conceptual in nature and illustrative of the principles involved. Some features of the mold assemblies used to manufacture a sole assembly have been enlarged or distorted relative to others to facilitate explanation and understanding. The same reference numbers are used in the drawings for similar or identical components and features shown in various alternative embodiments. Mold assemblies for a sole assembly and methods of manufacture for such a sole assembly as disclosed herein would have configurations and components determined, in part, by the intended application and environment in which they are used.

DETAILED DESCRIPTION OF CERTAIN PREFERRED EMBODIMENTS

An article of footwear 10 is depicted in FIG. 1 as including an upper 12 and a sole assembly 14. For purposes of reference in the following description, footwear 10 may be divided into three general regions: a forefoot region 16, a midfoot region 18, and a heel region 20. Regions 16-20 are not intended to demarcate precise areas of footwear 10. Rather, regions 16-20 are intended to represent general areas of footwear 10 that provide a frame of reference during the following discussion. Although regions 16-20 apply generally to footwear 10, references to regions 16-20 also may apply specifically to upper 12, sole assembly 14, or individual components within either upper 12 or sole assembly 14.

Upper 12 defines a void or chamber for receiving a foot. For purposes of reference, upper 12 includes a lateral side 22, an opposite medial side 24, and a vamp or instep area 26. Lateral side 22 is positioned to extend along a lateral side of the foot (i.e., the outside) and generally passes through each of regions 16-20. Similarly, medial side 24 is positioned to extend along an opposite medial side of the foot (i.e., the inside) and generally passes through each of regions 16-20. Upper 12 may also include a closure mechanism, such as lace 28. Upper 12 also includes an ankle opening 30 that provides the foot with access to the void within upper 12.

Upper 12 may also include an insole (or sockliner, not shown), which is generally a thin, compressible member located within the void for receiving the foot and proximate to a lower surface of the foot. Typically, the insole, which is configured to enhance footwear comfort, may be formed of foam, and optionally a foam component covered by a moisture wicking fabric or textile material. Further, the insole or sockliner may be glued or otherwise attached to the other components of footwear 10, although it need not be attached, if desired.

Sole assembly 14 may be directly secured to upper 12 with an adhesive, for example. Suitable adhesives are well known in the art and need not be discussed in greater detail here. Sole assembly 14 may be secured to upper 12 with any other suitable fastening means, and such other suitable means of sole assembly 14 to upper 12 will become readily apparent to those skilled in the art, given the benefit of this disclosure.

It is to be appreciated that in certain embodiments, sole assembly 14 may serve as a midsole, with an outsole (not shown) being secured to the bottom surface of the midsole. In other embodiments, as illustrated here, the bottom surface of sole assembly 14 serves as the ground-engaging portion (or other contact surface-engaging portion) of footwear 10.

Sole assembly 14 is responsible for attenuating ground (or other contact surface) reaction forces to lessen stresses upon the foot and leg, and absorb energy. Sole assembly 14 may also beneficially utilize such ground reaction forces for more efficient toe-off, and control potentially harmful foot motions, such as over pronation. Sole assembly 14 also forms a ground-engaging portion (or other contact surface-engaging portion) of sole assembly 10. As noted above, in certain embodiments there is a separate outsole member attached to the bottom surface of a midsole of sole assembly 14, while in other embodiments there is no separate outsole member of the sole assembly. The bottom surface of sole assembly 14 may include texturing to improve traction.

Sole assembly 14 is formed of a plurality of components having different colors. The method used to form the sole assembly from a plurality of preforms having different colors reduces the bleeding between the different colored portions, thereby enhancing the aesthetics of sole assembly 14. The plurality of components may also have, in addition to different colors, different physical properties or performance characteristics. For example, the hardness of the various components may be different. It is to be appreciated that any of the known physical properties or performance characteristics for sole assemblies can be different for the different components of sole assembly 14, thereby altering the support, cushioning, load carrying capability, wear characteristics, and tread life of sole assembly 14, for example. Other suitable physical properties or performance characteristics will become readily apparent to those skilled in the art, given the benefit of this disclosure.

Figure 2:
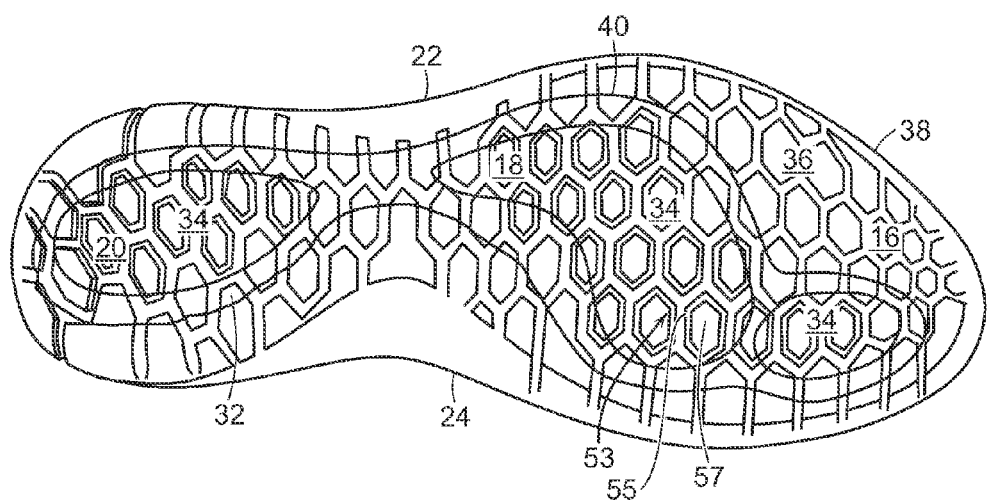
FIG. 2 is a plan view of a bottom of the sole assembly of FIG. 1.

As seen in the embodiment illustrated in FIG. 2, sole assembly 14 includes a first core portion 32, one or more inserts 34, and a perimeter portion 36. Core portion 32 is formed of a first color, inserts 34 are formed of a second color, and perimeter portion 36 is formed of a third color. While three colors are used in this embodiment, it is to be appreciated that any number of different colors may be used for the various components of sole assembly 14 in accordance with the method of manufacture described below.

In certain embodiments, core portion 32, inserts 34, and perimeter portion 36 may be formed of injection phylon (Ethylene Vinyl Acetate or "EVA"). The EVA may have a Vinyl Acetate (VA) level between approximately 9% and approximately 40%. Suitable EVA resins include Elvax®, provided by DuPont, and Engage, provided by the Dow Chemical Company, for example. In certain embodiments, the EVA may be formed of a combination of high melt index and low melt index material. For example, the EVA may have a melt index between approximately 1 and approximately 50.

The EVA may also include various components including a blowing agent. The blowing agent may have a percent weight between approximately 10% and approximately 20%. Suitable blowing agents include azodicarboamide, for example. In certain embodiments, a peroxide-based curing agent, such as dicumyl peroxide may be used. The amount of curing agent may be between approximately 0.6% and approximately 1.5%. The EVA may also include homogenizing agents, process aids, and waxes. For example, a mixture of light aliphatic hydrocarbons such as Struktol® 60NS may be included. The EVA may also include other constituents such as a release agent (e.g., stearic acid), activators (e.g., zinc oxide), fillers (e.g., magnesium carbonate), pigments, and clays.

As illustrated in FIG. 2, perimeter portion 36 may form an entire outer periphery 38 of sole assembly 14. In other embodiments, perimeter portion 36 may form just a portion of outer periphery 38. As illustrated here, perimeter portion 36 may also completely surround an outer periphery 40 of core portion 32. As illustrated here, inserts 34 may be completely surrounded by and contained within core portion 32.

Figure 3:
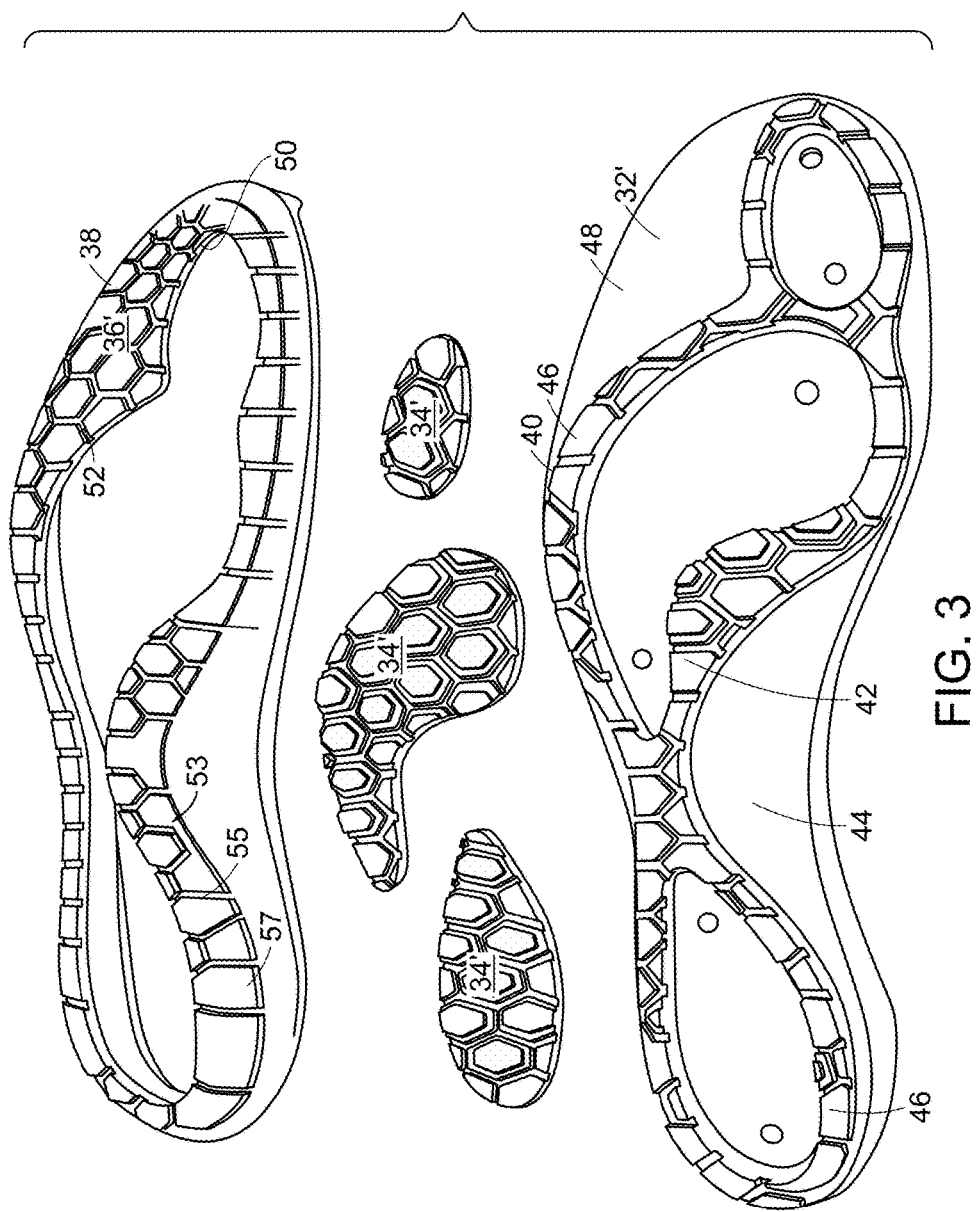
FIG. 3 is a perspective view in exploded form of the sole assembly of FIG. 1.

Preforms of the components of sole assembly 14 are seen in exploded form in FIG. 3. As seen here, core portion preform 32' includes ribs 42 that extend downwardly from its lower surface 44, and define a plurality of interior recesses 46. Each insert preform 34' is configured to be seated or received in one of interior recesses 46. Ribs 42 also define a shoulder 48 extending about at least a portion of core portion preform 32'.

An aperture 50 extending through perimeter portion preform 36' defines an interior lip 52 that is seated on shoulder 48 of core portion preform 32'. As seen in FIG. 2, in the finished product of sole assembly 14, the surface of aperture 50 abuts the exterior perimeter of ribs 42.

As seen here in FIG. 3, surface irregularities 53 may be formed in the lower surfaces of core portion preform 32', insert preforms 34', and perimeter portion preform 36'. Surface irregularities 53 may take any desired form. In the illustrated embodiment, surface irregularities 53 include a plurality of grooves 55 and lugs or projections 57, which form a grid of hexagonal projections 57 with corresponding grooves 55 surrounding the projections, as seen more clearly in sole assembly 14 in FIG. 2. Surface irregularities 53 may serve aesthetic as well as performance purposes.

Figure 4:
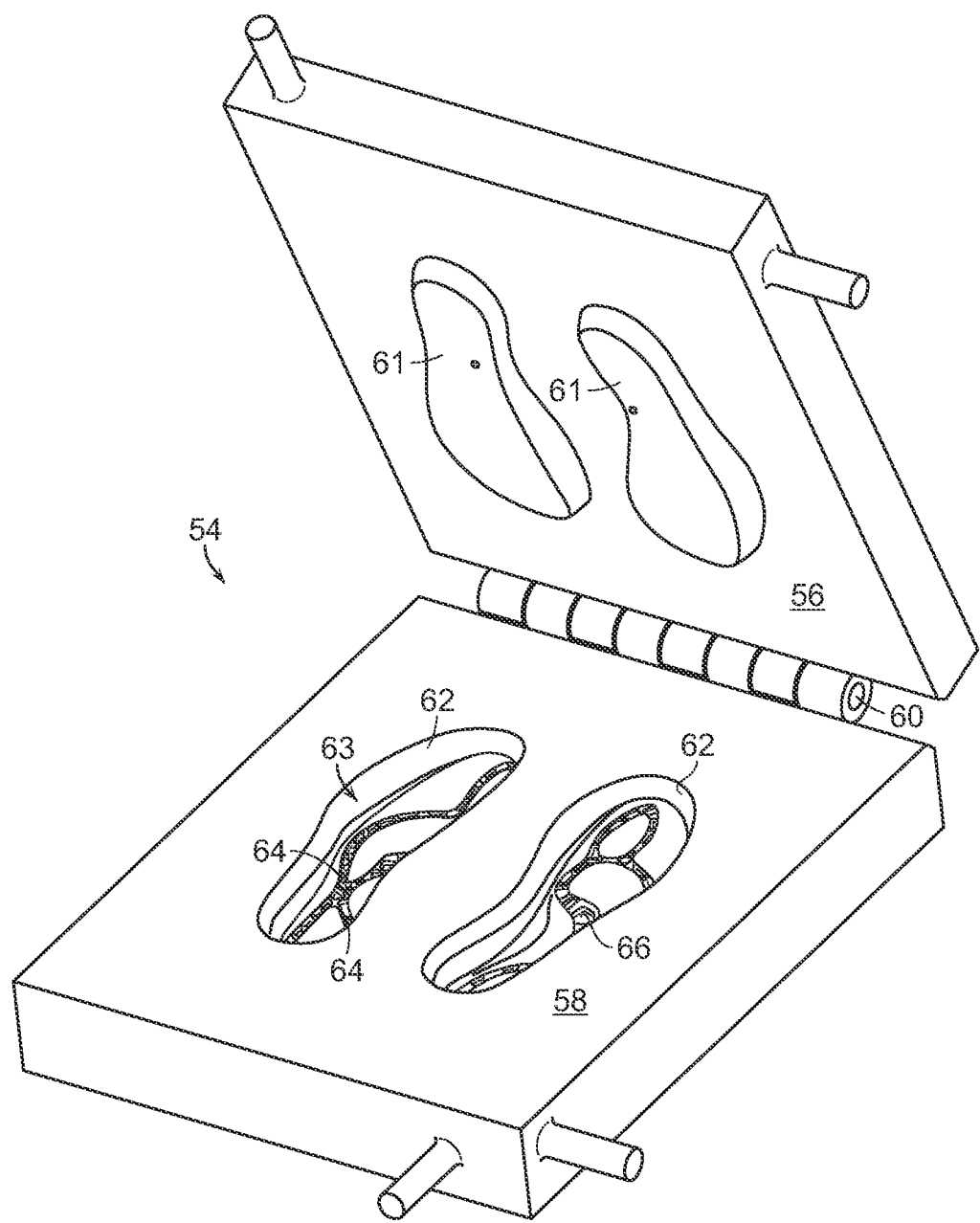
FIG. 4 is a perspective view of a first mold assembly used to form a core portion of the sole assembly of FIG. 3.

A method of forming sole assembly 14 that reduces bleeding between the colors of core portion preform 32', insert preforms 34', and perimeter portion preform 36' will now be described. As seen in FIG. 4, a first preform mold assembly 54, which is used to form core portion preform 32', includes an upper plate 56 and a lower plate 58. Upper plate 56 and lower plate 58 may be rotatably secured to one another with a hinge 60. A projection 61 extending downwardly from upper plate 56 and a lower recess 62 formed in lower plate 58 cooperate to define a core recess 63. As seen here, first preform mold assembly 54 includes two core recesses 63 in order to simultaneously form core portion preforms 32' for both left and right sole assemblies.

Recesses 64 formed in the bottom of core recess 63 serve to form ribs 42 when core portion preform 32' is formed in first preform mold assembly 54. Recesses 64 may include surface irregularities 66, which serve to form the mating surface irregularities 53 in the lower surface of ribs 42, as described above in conjunction with FIG. 2.

Core portion preform 32' is formed in core recess 63 of first preform mold assembly 54 in known fashion, with heated EVA being inserted into core recess 63. The resultant EVA core portion preform 32' is later combined with insert preforms 34' and perimeter preform 36' to form sole assembly 14, as described in greater detail below.

Figure 5:
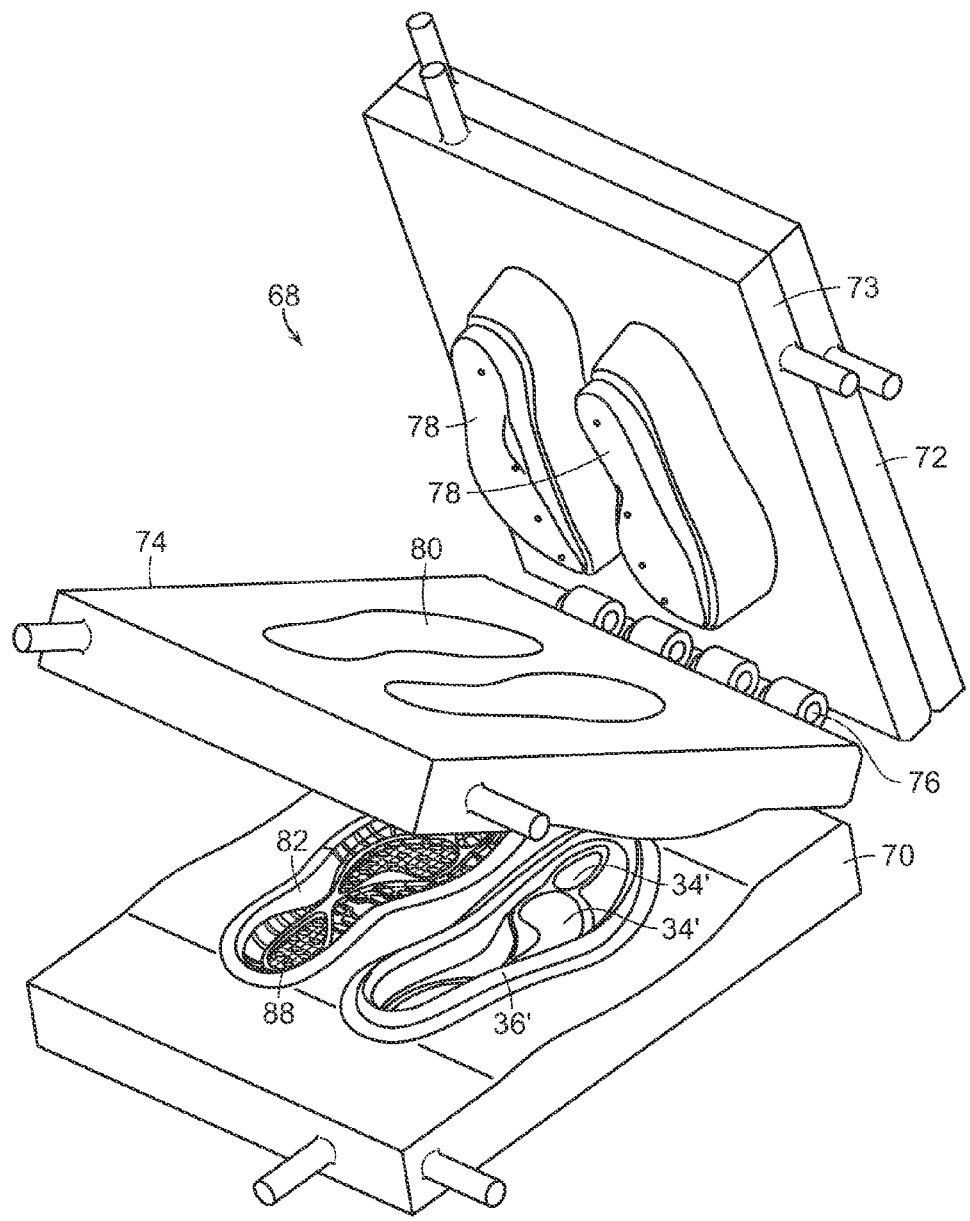
FIG. 5 is a perspective view of a second mold assembly used to form inserts and a perimeter portion of the sole assembly of FIG. 3.

A second preform mold assembly 68, seen in FIG. 5, is used to form insert preforms 34' and perimeter portion preform 36'. Second preform mold assembly 68 includes a bottom plate 70, a top plate 72, a core plate 73 positioned below top plate 72, and a sidewall plate 74 positioned between bottom plate 70 and core plate 73. The plates of second preform mold assembly 68 are connected by way of a hinge 76. A projection 78 extending downwardly from core plate 73, an aperture 80 extending through sidewall plate 74, and a recess 82 formed in the top surface of bottom plate 70 cooperate to define first, or insert, recesses 84 and a second, or perimeter, recess 86, seen in FIGS. 6 and 7. As seen here, second preform mold assembly 68 includes two sets of insert recesses 84 and two perimeter recesses 63 in order to simultaneously form of insert preforms 34' and perimeter portion preforms 36' for both left and right sole assemblies.

Surface irregularities 88 formed in the bottom surface of recess 82 serve to form the mating surface irregularities 53 in the lower surface of inserts 34 and perimeter portion 36, as described above with respect to core portion 32 and in conjunction with FIG. 2.

A perimeter portion preform 36' with insert preforms 34' seated therein and formed in second preform mold assembly 68 is shown here for illustrative purposes in the right recess 82 of bottom plate 70. It is to be appreciated that any number of insert preforms 34' may be formed in second preform mold assembly 68. In the illustrated embodiment, there are three insert preforms 34' used to form sole assembly 14. It is to be appreciated that a single insert preform 34', or any number of insert preforms 34', may be used to form sole assembly 14.

Figure 6:
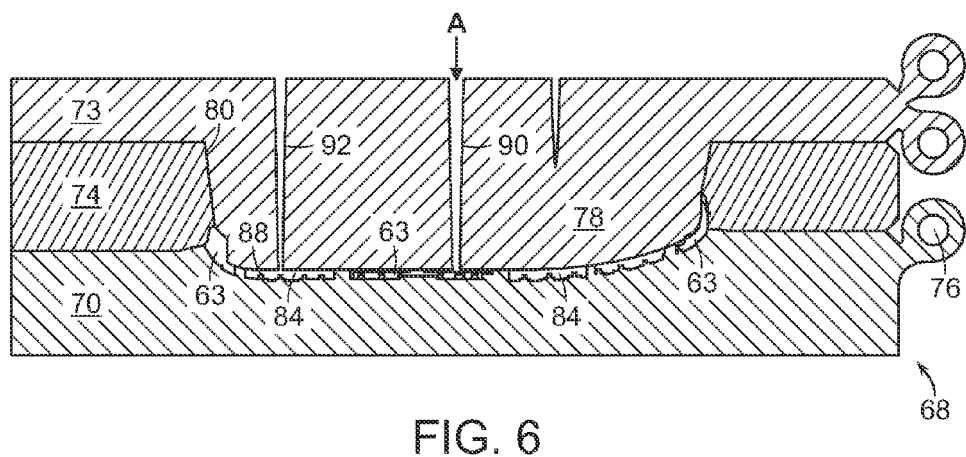
FIG. 6 is a section view of the bottom plate, sidewall plate, and core plate of the mold assembly of FIG. 5 seen in a closed position and abutting relationship.
Figure 7:
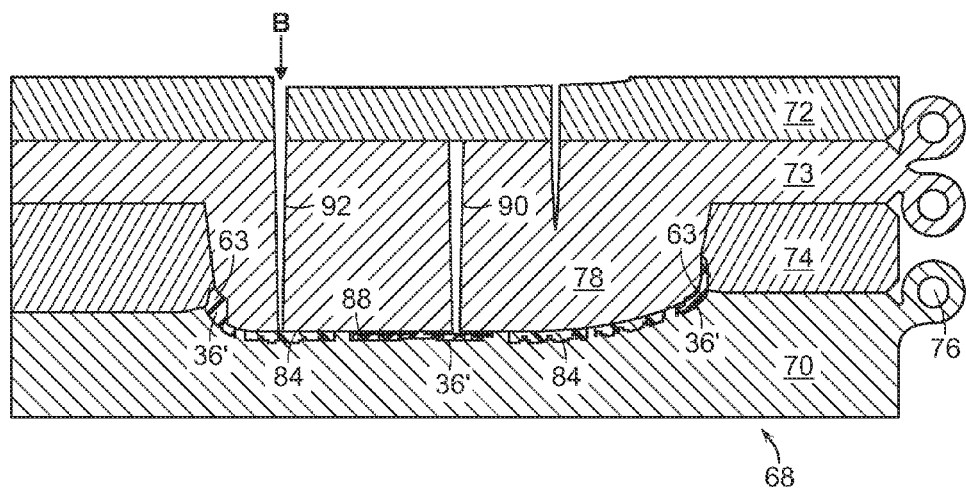
FIG. 7 is a section view of the bottom plate, sidewall plate, core plate, and top plate of the mold assembly of FIG. 5 seen in a closed position and abutting relationship.

As seen in FIG. 6, sidewall plate 74 and core plate 73 are pivoted downwardly into a closed position onto bottom plate 70. The heated EVA for forming perimeter portion preform 36' is then injected through a first gate 90 formed in core plate 73, as illustrated with arrow A. The EVA for perimeter portion preform 36' is thus positioned within perimeter recess 63.

After heated EVA is injected into perimeter recess 63, top plate 72 is then pivoted down into a closed position on core plate 73. Heated EVA for forming insert portions 34' is then injected through a second gate 92 formed in top plate 72 and core plate 73 into insert recesses 84. Thus, the configuration of the second preform mold assembly 68 allows for the simultaneous formation of two different colors of the injected EVA material to form both insert preforms 34' and perimeter portion preform 36'.

Figure 8:
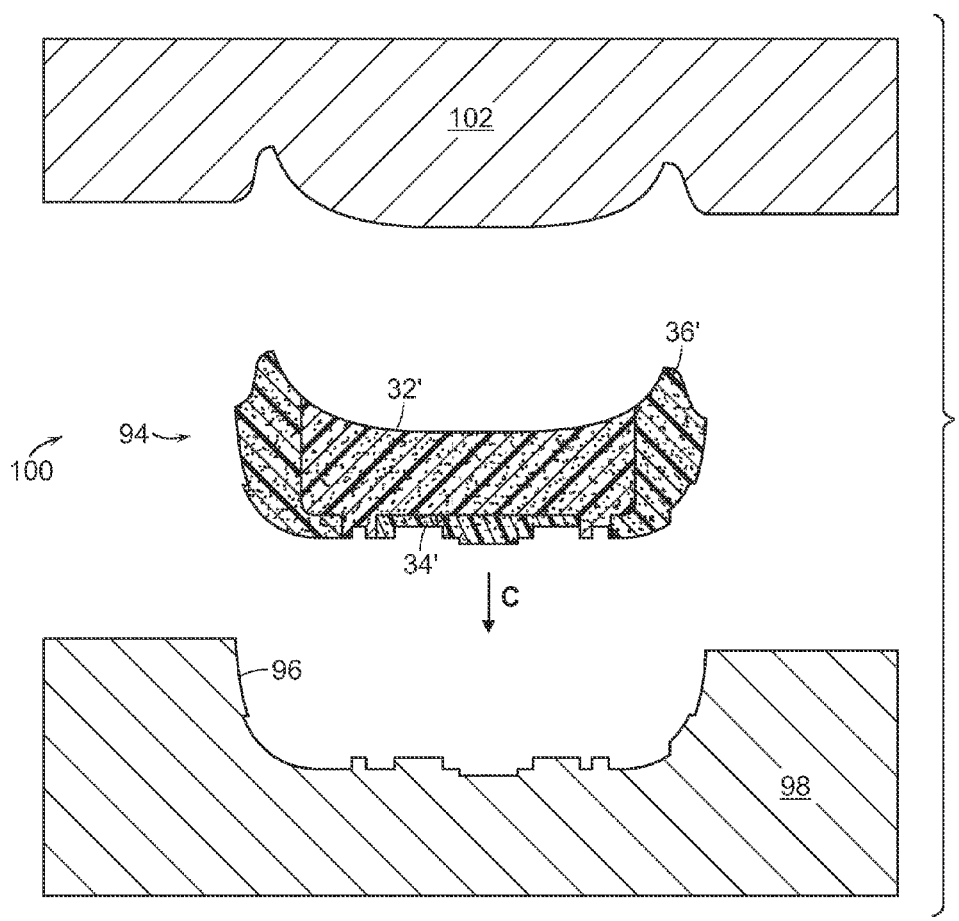
FIG. 8 is an elevation view of a third mold assembly having a top plate and a bottom plate, shown in exploded form with a preform prior to its positioning in the bottom plate.
Figure 9:
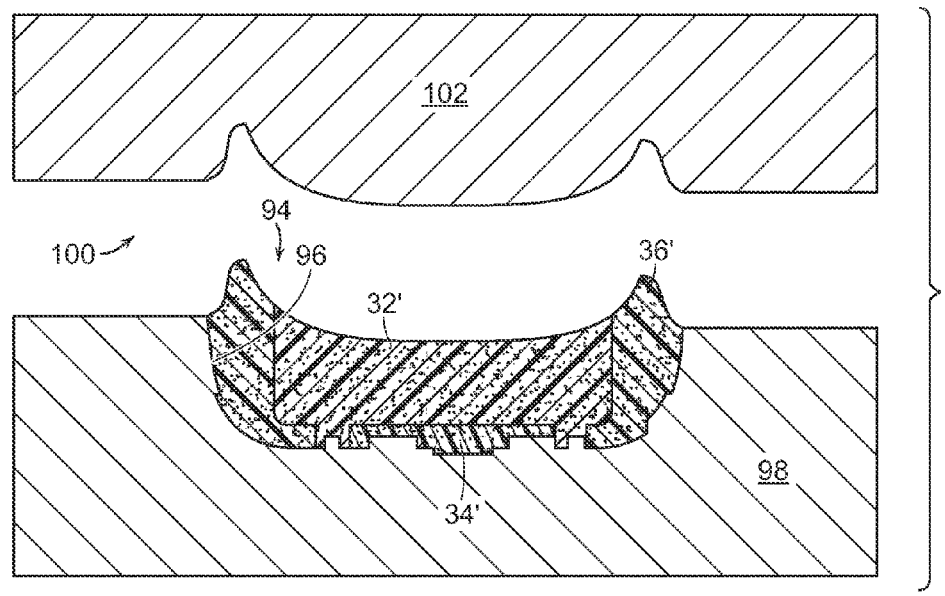
FIG. 9 is an elevation view of the third mold assembly of FIG. 8, shown with the preform in a recess in the bottom plate.
Figure 10:
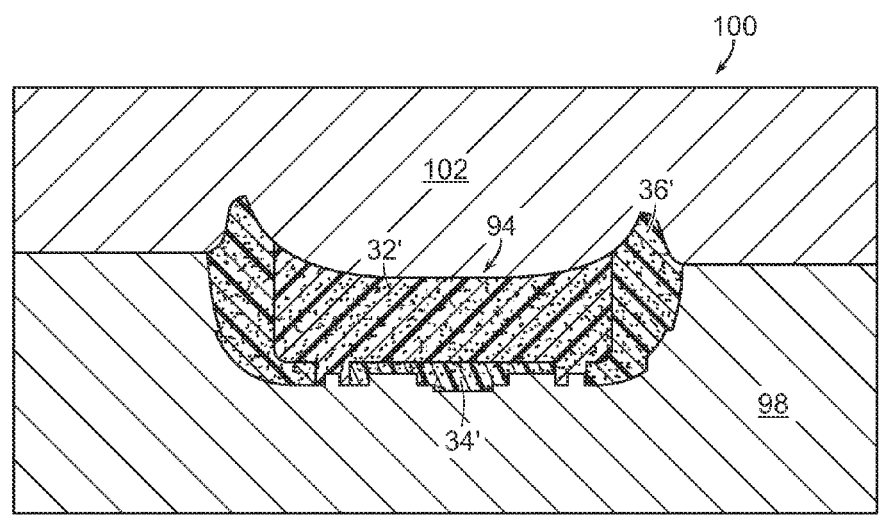
FIG. 10 is an elevation view of the third mold assembly of FIG. 8, shown in a closed condition.

All of the preforms, that is, core portion preform 32', insert preforms 34', and perimeter portion preform 36', each having a different color, are then preassembled into a single sole assembly preform 94. As illustrated in FIGS. 8-10, this unitary sole assembly preform 94, formed of all three colored materials is then placed in a single step into a recess 96 formed in a heated bottom plate 98 of a third mold assembly 100, as depicted by arrow C. Once sole assembly preform 94 is seated in recess 96, a top plate 102 of third mold assembly 100 is positioned on bottom plate 98 so as to close third mold assembly 100. Sole assembly preform 94 is then subjected to heat within third mold assembly 100 for a predetermined time period so that core portion preform 32', insert preforms 34', and perimeter portion preform 36' bond to one another, thereby forming sole assembly 14.

In certain embodiments, third mold assembly 100 is maintained at a temperature between approximately 170° C.

and 180° C. for approximately 10 minutes. The specific temperature and time period used to form sole assembly 14 in third mold assembly 100 can be varied, in known fashion, depending on the particular EVA used.

In known fashion, after sole assembly 14 is removed from third mold assembly 100, sole assembly 14 will expand. Sole assembly 14 then goes through typical stabilization steps, including cooling and trimming, as necessary.

By inserting the entire unitary preform 94 into recess 96 at one time, bleeding between the different colors of the portions of preform 94 as sole assembly 14 is formed is reduced, since all of the materials start melting at the same time upon insertion into third mold assembly 100.

In certain embodiments, as seen in FIG. 2 and noted above, the surface irregularities 53 may form a defined pattern. As seen in the embodiment illustrated here, surface irregularities 53 form a grid of hexagonal projections 57 with corresponding grooves 55 formed about projections 57. In such an embodiment, it may be desirable to have the boundaries between the different colors, that is, the color lines between core portion 32, inserts 34, and perimeter portion 36 not match or follow exactly along the edges of projections 57 or grooves 55. Any bleeding between the different colors will be more observable if the color lines are attempted to line up with the edges of projections 57 and grooves 55. The user's eye will be less likely drawn to the bleeding if the color lines move across projections 57, rather than exclusively along the perimeters of projections 57.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of forming a sole assembly, comprising the steps of:
    positioning a plurality of polymer foam preforms together to form a unitary sole assembly preform, at least one of the plurality of polymer foam preforms having a color that is different than a color of another one of the plurality of polymer foam preforms, wherein the plurality of polymer foam preforms includes a first polymer foam preform, a second polymer foam preform, and a third polymer foam preform, and wherein in the unitary sole assembly preform:
    (i) the first polymer foam preform includes: (a) a first interior recess having a lower surface, wherein an outer periphery of the first interior recess is surrounded by a rib formed as part of the first polymer foam preform and (b) a shoulder extending about at least a portion of the rib and located on an opposite side of the rib from the first interior recess,
    (ii) the second polymer foam preform is received the first interior recess and is completely surrounded by the rib, and
    (iii) the third polymer foam preform includes an aperture into which the rib of the first polymer foam preform is received and an interior lip that is seated on the shoulder of the first polymer foam preform;
    placing the unitary sole assembly preform in a recess in a first portion of a heated mold assembly at one time in a single step, the first portion of the mold assembly being pre-heated to at least a melting temperature of the unitary sole assembly preform such that all of the plurality of polymer foam preforms of the unitary sole assembly preform start to melt at the same time upon insertion into the first portion of the mold assembly;
    closing the mold assembly such that a second portion of the mold assembly is above and in contact with the first portion;
    subjecting the unitary sole assembly preform to heat such that the plurality of polymer foam preforms bond to one another to form a sole assembly;
    opening the mold assembly; and
    removing the sole assembly from the mold assembly.

2. The method of claim 1, wherein at least one of the plurality of polymer foam preforms has a performance characteristic that is different than a performance characteristic of at least one other polymer foam preform.

3. The method of claim 1, wherein the first polymer foam preform is formed in a first preform mold assembly.

4. The method of claim 3, wherein a bottom surface of a recess of the first preform mold assembly includes at least one surface irregularity.

5. The method of claim 4, wherein said at least one surface irregularity comprises one of a projection and a recess.

6. The method of claim 1, wherein the second polymer foam preform and the third polymer foam preform are formed in a second preform mold assembly.

7. The method of claim 6, wherein the second polymer foam preform and the third polymer foam preform each has a color that is different than the other.

8. The method of claim 6, wherein bottom surfaces of each of a first recess and a second recess of the second preform mold assembly include at least one surface irregularity.

9. The method of claim 8, wherein said at least one surface irregularity on the bottom surface of each of the first recess and the second recess comprises one of a projection and a recess.

10. A method of forming a sole assembly, comprising the steps of:
    positioning a first polymer foam preform having a first color, a second polymer foam preform having a second color, and a third polymer foam preform having a third color together to form a unitary sole assembly preform, wherein in the unitary sole assembly preform:
    (i) the first polymer foam preform includes: (a) a first interior recess having a lower surface, wherein an outer periphery of the first interior recess is surrounded by a rib formed as part of the first polymer foam preform and (b) a shoulder extending about at least a portion of the rib and located on an opposite side of the rib from the first interior recess,
    (ii) the second polymer foam preform is received the first interior recess and is completely surrounded by the rib, and
    (iii) the third polymer foam preform includes an aperture into which the rib of the first polymer foam preform is received and an interior lip that is seated on the shoulder of the first polymer foam preform;
    placing the unitary sole assembly preform in a recess in a first portion of a heated mold assembly at one time in a single step, the first portion of the heated mold assembly being pre-heated to at least a melting temperature of the unitary sole assembly preform such that the first polymer foam preform, the second polymer foam preform, and the third polymer foam preform of the unitary sole assembly preform start to melt at the same time upon insertion into the first portion of the mold assembly;

closing the mold assembly such that a second portion of the mold assembly is above and in contact with the first portion;

subjecting the unitary sole assembly preform to heat such that the first polymer foam preform, the second polymer foam preform, and the third polymer foam preform bond to one another to form a sole assembly;

opening the mold assembly; and removing the sole assembly from the mold assembly.

11. The method of claim 10, wherein a plurality of second polymer foam preforms having the second color are used to form the unitary sole assembly preform.

12. The method of claim 10, wherein the first polymer foam preform is formed in a first preform mold assembly.

13. The method of claim 10, wherein the second polymer foam preform and the third polymer foam preform are formed in a second preform mold assembly.

14. A method of forming a sole assembly, comprising the steps of:

forming a first polymer foam preform having a first color in a recess of a first mold assembly, wherein the step of forming the first polymer foam preform includes forming the first polymer foam preform to include: (a) a first interior recess having a lower surface, wherein an outer periphery of the first interior recess is surrounded by a rib formed as part of the first polymer foam preform and (b) a shoulder extending about at least a portion of the rib and located on an opposite side of the rib from the first interior recess;

forming a plurality of second polymer foam preforms having a second color in first recesses of a second mold assembly;

forming a third polymer foam preform having a third color in a second recess of the second mold assembly, wherein the step of forming the third polymer foam preform includes forming an aperture and an interior lip in the third polymer foam preform;

positioning the second polymer foam preform in the first interior recess of the first polymer foam preform, and positioning the third polymer foam preform with respect to the first polymer foam preform such that the interior lip of the third polymer foam preform is seated on the shoulder of the first polymer foam preform and a side surface of the aperture of the third polymer foam preform abuts an outer periphery of the rib of the first foam polymer preform, wherein the positioning steps place the first polymer foam preform, the second polymer foam preform, and the third polymer foam preform together to form a unitary sole assembly preform;

placing the unitary sole assembly preform in a recess in a first portion of a third mold assembly at one time in a single step, the first portion of the third mold assembly being pre-heated to at least a melting temperature of the unitary sole assembly preform;

closing the third mold assembly such that a second portion of the third mold assembly is above and in contact with the first portion;

subjecting the unitary sole assembly preform in the third mold assembly to heat such that the first polymer foam preform, the second polymer foam preform, and the third polymer foam preform bond to one another to form a sole assembly;

opening the third mold assembly;

removing the sole assembly from the third mold assembly;

allowing the sole assembly to cool; and trimming the sole assembly.

15. The method of claim 14, wherein the step of forming the first polymer foam preform further includes forming the first polymer foam preform to include a second interior recess having a lower surface, wherein an outer periphery of the second interior recess is surrounded by the rib formed as part of the first polymer foam preform, and wherein the positioning steps further include positioning an additional polymer foam preform in the second interior recess of the first polymer foam preform, wherein the additional polymer foam preform is included in the unitary sole assembly preform in the placing step.

16. The method of claim 14, wherein the step of forming the first polymer foam preform further includes forming the first polymer foam preform to include a second interior recess having a lower surface and a third interior recess having a lower surface, wherein an outer periphery of the second interior recess is surrounded by the rib formed as part of the first polymer foam preform and an outer periphery of the third interior recess is surrounded by the rib formed as part of the first polymer foam preform, and wherein the positioning steps further include positioning a first additional polymer foam preform in the second interior recess of the first polymer foam preform and positioning a second additional polymer foam preform in the third interior recess of the first polymer foam preform, wherein the first additional polymer foam preform and the second additional polymer foam preform are included in the unitary sole assembly preform in the placing step.

17. The method of claim 16, wherein in the positioning steps, the first polymer foam preform, the second polymer foam preform, the third polymer foam preform, the first additional polymer foam preform, and the second additional polymer foam preform are positioned so as to form a portion of an exterior bottom surface of the sole assembly.

* * * * *